(12) United States Patent
Egashira et al.

(10) Patent No.: US 7,917,404 B2
(45) Date of Patent: *Mar. 29, 2011

(54) SYSTEM FOR COMMODITY SALES

(75) Inventors: Kiyofusa Egashira, Yokohama (JP); Noriaki Mizuno, Tokyo-to (JP)

(73) Assignee: International Business Machines Corporation, Armonk, NY (US)

( * ) Notice: Subject to any disclaimer, the term of this patent is extended or adjusted under 35 U.S.C. 154(b) by 304 days.

This patent is subject to a terminal disclaimer.

(21) Appl. No.: 12/136,137

(22) Filed: Jun. 10, 2008

(65) Prior Publication Data

US 2008/0249821 A1 Oct. 9, 2008

Related U.S. Application Data

(63) Continuation of application No. 09/977,634, filed on Oct. 15, 2001, now Pat. No. 7,398,228.

(30) Foreign Application Priority Data

Oct. 16, 2000 (JP) .................................. 2000-314902

(51) Int. Cl.
*G06Q 30/00* (2006.01)
(52) U.S. Cl. ..................... 705/26.2; 705/27.1; 705/26.41
(58) Field of Classification Search ............... 705/26–27
See application file for complete search history.

(56) References Cited

U.S. PATENT DOCUMENTS

| 5,689,652 | A | 11/1997 | Lupien et al. |
| 5,794,207 | A | 8/1998 | Walker et al. |
| 5,835,896 | A | 11/1998 | Fisher et al. |
| 5,924,082 | A | 7/1999 | Silverman et al. |
| 6,035,289 | A | 3/2000 | Chou et al. |
| 6,629,082 | B1 | 9/2003 | Hambrecht et al. |
| 6,751,597 | B1 | 6/2004 | Brodsky et al. |

FOREIGN PATENT DOCUMENTS

| JP | 10-320494 | 9/1997 |
| JP | 11353361 | 12/1999 |
| JP | 2001-265964 | 3/2000 |
| JP | 2001-357248 | 12/2000 |

OTHER PUBLICATIONS

Hermann, Simon et al., "Price Customization, Marketing Management", Fall 1998, v7, n3, pp. 10-17, Dialog file 15 #01722905, 9pgs.

*Primary Examiner* — Robert M. Pond
(74) *Attorney, Agent, or Firm* — Steven M. Greenberg, Esq.; Carey Rodriguez Greenberg Paul LLP

(57) ABSTRACT

The wishes of purchasers and sellers of particular commodity items are matched using a computer database. Hopeful purchasers submit requests during a predetermined sale time frame. The requests include a desired purchase price and a desired purchase quantity for the particular commodity item. After the predetermined period, purchaser information is used to produce a purchase wish list in a predetermined order. An optimum combination of intending purchasers, selling quantities, selling prices, commodity suppliers, supply quantities, and supply prices is created by comparing the purchase wish list with a supply list.

5 Claims, 7 Drawing Sheets

| SUPPLY QUANTITY | 1 ~ 1000 | 1001 ~ 2000 | 2001 ~ 3000 | 3001 ~ 4000 | ... |
|---|---|---|---|---|---|
| SUPPLY PRICE (YEN) | | | | | ... |

ITEM : XXXX (APPLY FOR PURCHASE ON OR BEFORE DDMM,2000)
STANDARD RETAIL PRICE: 4,000 YEN

CLICK HERE FOR ITEM DESCRIPTION → [ITEM DESCRIPTION]
INPUT DESIRED PURCHASE PRICE AND QUANTITY
    DESIRED PURCHASE PRICE [_____] YEN
    DESIRED PURCHASE QUANTITY [_____] UNITS

REVIEW AND IF IT IS COMPLETE → [CONFIRM] ⟵ 60
CLICK CONFIRMATION BUTTON

FIG. 5

| INTENDING PURCHASER | DESIRED PURCHASE PRICE (YEN) | DESIRED PURCHASE QUANTITY |
|---|---|---|
| 1 | 3,500 | 400 |
| 2 | 3,400 | 350 |
| 3 | 3,400 | 300 |
| 4 | 3,400 | 100 |
| 5 | 3,200 | 200 |
| 6 | 3,200 | 150 |
| 7 | 3,200 | 100 |
| 8 | 3,200 | 150 |
| 9 | 3,150 | 200 |
| 10 | 3,100 | 50 |
| 11 | 3,100 | 300 |
| 12 | 3,000 | 150 |
| 13 | 3,000 | 200 |
| 14 | 2,900 | 1,200 |
| 15 | 2,700 | 100 |

FIG. 6

| i | Pi | Vi | ΣVi | Si | Cj | Gi | MaxGi |
|---|---|---|---|---|---|---|---|
| 1 | 3,500 | 400 | 400 | 3,400 | Ca,Cb | 40,000 | 40,000 |
| 2 | 3,400 | 350 | 750 | 3,400 | Ca,Cb | 40,000 | 40,000 |
| 3 | 3,400 | 300 | 1,050 | 3,200 | Cb | 250,000 | 250,000 |
| 4 | 3,400 | 100 | 1,150 | 3,200 | Cb | 270,000 | 270,000 |
| 5 | 3,200 | 200 | 1,350 | 3,200 | Cb | 270,000 | 270,000 |
| 6 | 3,200 | 150 | 1,500 | 3,200 | Cb | 270,000 | 270,000 |
| 7 | 3,200 | 100 | 1,600 | 3,200 | Cb | 270,000 | 270,000 |
| 8 | 3,200 | 150 | 1,750 | 3,200 | Cb | 270,000 | 270,000 |
| 9 | 3,150 | 200 | 1,950 | 3,200 | Cb | 260,000 | 270,000 |
| 10 | 3,100 | 50 | 2,000 | 3,200 | Cb | 255,000 | 270,000 |
| 11 | 3,100 | 300 | 2,300 | 3,000 | Ca | 685,000 | 685,000 |
| 12 | 3,000 | 150 | 2,450 | 3,000 | Ca | 685,000 | 685,000 |
| 13 | 3,000 | 200 | 2,650 | 3,000 | Ca | 685,000 | 685,000 |
| 14 | 2,900 | 1,200 | 3,850 | 2,900 | Ca | 950,000 | 950,000 |
| 15 | 2,700 | 100 | 3,950 | 2,900 | Ca | 930,000 | 950,000 |

FIG. 8

FOR I = 2 (SUPPLY QUANTITY RANGE : 1 TO 1,000)

| Pi | Vi | Si | GROSS PROFIT | Gi |
|---|---|---|---|---|
| 3,500 | 400 | 3,400 | 40,000 | 40,000* |
| 3,400 | 350 | 3,400 | 0 | 40,000 |

FIG. 9

FOR j = 10 (SUPPLY QUANTITY RANGE : 1,001 TO 2,000)

| Pi | Vi | Si | GROSS PROFIT | Gi |
|---|---|---|---|---|
| 3,500 | 400 | 3,200 | 120,000 | 12,000 |
| 3,400 | 350 | 3,200 | 70,000 | 190,000 |
| 3,400 | 300 | 3,200 | 60,000 | 250,000 |
| 3,400 | 100 | 3,200 | 20,000 | 270,000* |
| 3,200 | 200 | 3,200 | 0 | 270,000 |
| 3,200 | 150 | 3,200 | 0 | 270,000 |
| 3,200 | 100 | 3,200 | 0 | 270,000 |
| 3,200 | 150 | 3,200 | 0 | 270,000 |
| 3,150 | 200 | 3,200 | -10,000 | 260,000 |
| 3,100 | 50 | 3,200 | -5,000 | 255,000 |

FIG. 10

FOR i = 13 (SUPPLY QUANTITY RANGE : 2,001 TO 3,000)

| Pi | Vi | Si | GROSS PROFIT | Gi |
|---|---|---|---|---|
| 3,500 | 400 | 3,000 | 200,000 | 200,000 |
| 3,400 | 350 | 3,000 | 140,000 | 340,000 |
| 3,400 | 300 | 3,000 | 120,000 | 460,000 |
| 3,400 | 100 | 3,000 | 40,000 | 500,000 |
| 3,200 | 200 | 3,000 | 40,000 | 540,000 |
| 3,200 | 150 | 3,000 | 30,000 | 570,000 |
| 3,200 | 100 | 3,000 | 20,000 | 590,000 |
| 3,200 | 150 | 3,000 | 30,000 | 620,000 |
| 3,150 | 200 | 3,000 | 30,000 | 650,000 |
| 3,100 | 50 | 3,000 | 5,000 | 655,000 |
| 3,100 | 300 | 3,000 | 30,000 | 685,000 |
| 3,000 | 150 | 3,000 | 0 | 685,000* |
| 3,000 | 200 | 3,000 | 0 | 685,000 |

FIG. 11

FOR I = 15 (SUPPLY QUANTITY RANGE : 3,001 TO 4,000)

| PI | VI | SI | GROSS PROFIT | GI |
|---|---|---|---|---|
| 3,500 | 400 | 2,900 | 240,000 | 240,000 |
| 3,400 | 350 | 2,900 | 175,000 | 415,000 |
| 3,400 | 300 | 2,900 | 150,000 | 565,000 |
| 3,400 | 100 | 2,900 | 50,000 | 615,000 |
| 3,200 | 200 | 2,900 | 60,000 | 675,000 |
| 3,200 | 150 | 2,900 | 45,000 | 720,000 |
| 3,200 | 100 | 2,900 | 30,000 | 750,000 |
| 3,200 | 150 | 2,900 | 45,000 | 795,000 |
| 3,150 | 200 | 2,900 | 50,000 | 845,000 |
| 3,100 | 50 | 2,900 | 10,000 | 855,000 |
| 3,100 | 300 | 2,900 | 60,000 | 915,000 |
| 3,000 | 150 | 2,900 | 15,000 | 930,000 |
| 3,000 | 200 | 2,900 | 20,000 | 950,000* |
| 2,900 | 1,200 | 2,900 | 0 | 950,000 |
| 2,700 | 100 | 2,900 | −20,000 | 930,000 |

FIG. 12

SYSTEM FOR COMMODITY SALES

The current application is a continuation application of U.S. patent application Ser. No. 09/977,634, filed on Oct. 15, 2001 now U.S. Pat. No. 7,398,228, which is hereby incorporated by reference.

FIELD OF THE INVENTION

The present invention relates to a commodity sales system and, more particularly, to a method and system for combining the wishes of purchasers and suppliers or manufacturers of commodities so that a seller can make the maximum gross profit.

BACKGROUND ART

On the general market, commodity selling prices are set by sellers or intermediaries in expectation of certain profit margins. This is true both for selling commodities at real shops and through communication networks such as the Internet. The pricing system is on a one-way basis from the side of sellers or intermediaries to consumers (purchasers), and therefore, if a commodity is too expensive for customers, they refrain from buying the commodity, or they buy the commodity from another source selling the same commodity at a lower price, or they buy a cheaper, similar commodity.

In order to encourage consumers to buy more commodities, business models have recently been proposed, in which a purchaser of a particular commodity (including service) sets a price for the commodity, and purchases the commodity from any seller willing to sell the commodity for that price. Among them, U.S. Pat. No. 5,794,207 is well known as a so-called "reverse auction" patent.

Japanese Published Unexamined Patent Application (PUPA) No. 11-353361 discloses a commodity sales system according to which an intermediary exhibits a commodity on a communication network, and receives arbitrary bids for the commodity from intending purchasers for a prescribed period. After the period has expired, based on the bidding results, the intermediary presents one or more sellers with a weighted mean price obtained by averaging bidding prices equal to or higher than a prescribed reference price, using the number of their bids as a weight, and with a desired purchase quantity corresponding to the number of bids. After a seller willing to sell the desired quantity of the commodities at the weighted mean price becomes entitled to sell, the intermediary collects the bidding price for each of the commodities from the purchasers who bid at a price greater than or equal to the reference price. The intermediary receives a prescribed percentage of the collected money as a fee, and the seller receives the remainder.

A system which allows a purchaser to set a price may afford greater satisfaction compared to conventional one-way pricing methods, but a reverse auction as disclosed in the above U.S. patent aims at individual sales, and therefore, price reduction cannot be expected as in mass-market sales. In the invention disclosed in the PUPA noted above, since purchasers who bid lower than the reference price are disqualified, there is no essential merit of scale for the seller or the intermediary. Furthermore, since the intermediary negotiates with a plurality of sellers or commodity suppliers after the bidding is closed, and decides who is to be an actual supplier, it takes time until the business deal with the purchaser is settled, and, in some cases, the commodities cannot be sold after all due to unsuccessful negotiations with the suppliers. Thus, the intermediary could hardly maximize profit.

SUMMARY OF THE INVENTION

It is therefore an object of the present invention to provide a method and system for allowing a seller (intermediary) to maximize profit by combining wishes of intending purchasers and commodity suppliers (manufacturers).

According to a first aspect of the present invention, a commodity sales method comprises the steps of obtaining supply information including a supply quantity and price from at least one commodity supplier for a particular commodity item and arranging the information into a supply list for storage in a database; receiving purchase wish information including a desired purchase price and a desired purchase quantity for the particular commodity item from intending purchasers through a network for a predetermined period; storing the received purchase wish information in the database; after the predetermined period, collecting the purchase wish information stored in the database and producing a purchase wish list having the information arranged in a predetermined order; selecting an optimum combination of intending purchasers, selling quantities, selling prices, commodity suppliers, supply quantities, and supply prices by comparing the purchase wish list with the supply list; and transmitting a purchase admission notification to the intending purchasers selected in the selecting step.

According to a second aspect of the present invention, a commodity sales system comprises a database storing, in a supply list, information about a supply quantity and a supply price obtained from at least one commodity supplier for a particular commodity item; means for receiving purchase wish information including a desired purchase price and a desired purchase quantity for the particular commodity item from intending purchasers through a network for a predetermined period, and storing the received purchase wish information in the database; means for collecting the purchase wish information stored in the database and producing a purchase wish list having the information arranged in a predetermined order after the predetermined period; means for selecting an optimum combination of intending purchasers, selling quantities, selling prices, commodity suppliers, supply quantities, and supply prices by comparing the purchase wish list with the supply list; and means for transmitting a purchase admission notification to the intending purchasers selected by the selecting means.

As described above, the present invention allows a seller to sell commodities to purchasers such that maximum gross profit is obtained once the seller simply has purchase wish information from a plurality of purchasers and can confirm quantities and prices. To this end, the seller obtains in advance supply quantities and supply prices from a plurality of commodity suppliers, which are to be combined in an optimum way to maximize the gross profit. The seller obtains in advance selling prices or costs depending on supply quantities from a plurality of commodity suppliers, so that the combination to maximize the profit can be immediately obtained. The commodity supplier can supply an increased quantity and provide the most competitive selling price to the seller, so that more flexible business transactions can be achieved, which leads to increase in the profit of the company and reduction in commodity stocks. The number of purchasers increases, desired commodities can be purchased at desired prices, and the purchasers can save time which would otherwise have been spent looking around for other retailers. While the seller obtains maximum gross profit from the above system, additional orders may be made at the seller's risk if the cost can be lowered as the quantity increases. Commodities to be stocked for the seller may be included in the next sales or separately sold for avoiding the risk. The process is stopped at the point where the maximum gross profit is obtained based on the combination, each intending purchaser selected is notified of the desired purchase price and quantity, and each commodity supplier selected is notified of the supply quantity and selling price.

BRIEF DESCRIPTION OF THE DRAWINGS

Embodiments of the present invention will now be explained in more detail, by way of example, with reference to the accompanying drawings in which:

FIG. 5 shows an example of a home page screen displayed when an intending purchaser accesses the seller server to input purchase wish information;

FIG. 6 shows an example of purchase wish information stored in the database in the seller server after expiration of a sales period;

FIG. 8 is a table showing the results of applying the operation in FIG. 7 to the lists in FIGS. 4 and 6 in the order of time;

FIG. 9 shows the calculation results of gross profit for i=2;

FIG. 10 shows the calculation results of gross profit for i=10;

FIG. 11 shows the calculation results of gross profit for i=13; and

FIG. 12 shows the calculation results of gross profit for i=15.

PREFERRED EMBODIMENTS OF THE INVENTION

Figures 1, 3:
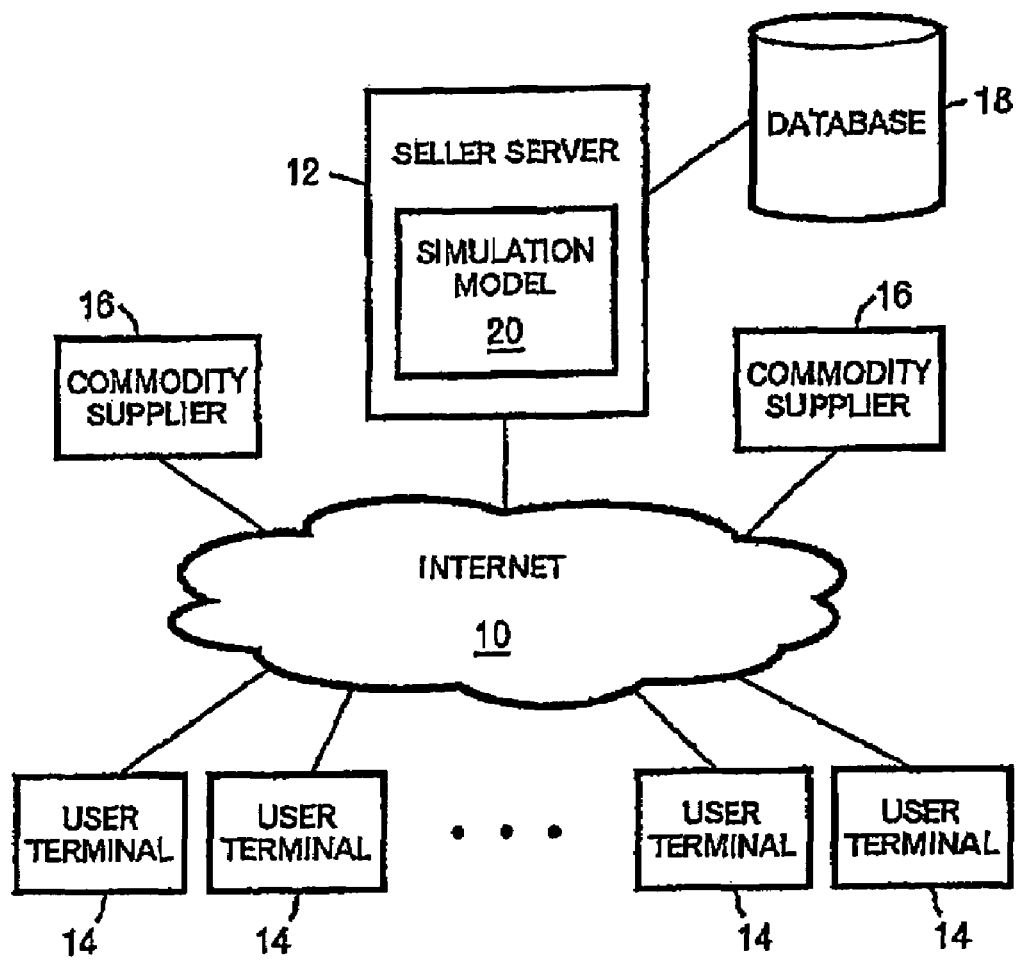
FIG. 1 shows an exemplary configuration of a network system in which the present invention may be implemented.
FIG. 3 shows an exemplary form used by a seller to request a commodity supplier to provide supply information.

FIG. 1 shows the general configuration of a network system in which the present invention may be implemented. While the illustrated system is based on Internet 10, the network need not be limited to the Internet as far as the present invention is concerned. In addition to a seller server 12 which is the core of the present invention, many terminals of intending purchasers (user terminals) 14 and commodity suppliers 16 are connected to the Internet 10. The seller server 12 is connected to a database 18 to store a list of commodity supply information obtained from the commodity suppliers 16 and purchase wish information received from intending purchasers. The seller server 12 also includes a simulation model 20 used to process the information stored in the database 18 so as to select an optimum combination of intending purchasers, sales quantities, selling prices, commodity suppliers, supply quantities, and supply prices. The simulation model 20 is an engine for executing the flow shown in FIG. 2. This engine may actually be implemented by software (program).

While the user terminal 14 may be any terminal capable of connecting to the Internet 10 and transmitting some information, a terminal with a relatively large display screen such as a personal computer is preferable because the user order commodities on the home page screen of the seller server 12 may be quite large.

Referring to the flowchart in FIG. 2, the simulation model 20 executed by the seller server 12 will now be described. The simulation model 20 is intended for sales to retailers and/or mass-consumption people. In the first step S1, the seller obtains data (hereinafter referred to as "supply information") on a supply quantity and a supply price (cost price for the seller) of a commodity item from at least one supplier or manufacturer of the commodity item prior to sales thereof, and the information is stored in the database 18. While the supply information in the example of FIG. 1 is received by the seller server 12 through the Internet 10, the supply information may also be received by other communication means such as a telephone or offline. Since the supply information contains seller confidential information which should not be made available to general consumers, communication between the seller and the commodity suppliers is preferably done in a secure environment.

The supply information from each commodity supplier is received by the seller server 12, for example, in the form as shown in FIG. 3. A supply price is designated for each supply quantity range set by the seller. In the example shown in FIG. 3, the supply quantity range is set on a 1000-basis, but the number of units or pieces in each range may be set by the seller. It is desirable for the seller to obtain supply information from a plurality of suppliers in order to benefit from competition among commodity suppliers and to secure a second source. An example of a summarized supply list of supply information obtained from the suppliers is given in FIG. 4. In FIG. 4, "N/A" shows that a corresponding supplier cannot supply the quantities in the designated ranges. For example, the supplier Cb can supply up to 3000 units or pieces while the supplier Cc can supply up to 2000 units or pieces. As will be described later, the seller receives purchase requests/wishes within a predetermined period (or a closing date), and, therefore, it is preferable for the commodity suppliers to provide supply information with a predetermined time limit for delivery. Thus, the quantity which can be supplied by that date are determined depending on the respective suppliers. This is represented by "N/A." After the list shown in FIG. 4 is stored in the database 18, the model exits step S1. Thus, the sales preparation has been completed.

Then, the simulation model 20 proceeds to step S2 where a sales period is specified and desired purchase prices and quantities are received from purchasers. FIG. 5 shows an example of a home page screen on the display (not shown) of a user terminal 14 (FIG. 1), when a purchaser accesses the seller server 12 through the Internet. The purchaser must log in with a user ID and password before the image shown in FIG. 5 is displayed. Since such a log-in operation is well known in the art, its detail is not described. When the intending purchaser finishes inputting the desired purchase price and quantity and clicks a confirmation button 60, the input data is sent together with the user ID for storage in the database 18. In the example shown in FIG. 5, a sales period during which purchase requests are accepted expires on DD MM, 2000.

After expiration of the sales period, the simulation model 20 proceeds to step S3 (FIG. 4) to retrieve the purchase wish data stored in the database 18 and to arrange the data in descending order from the highest desired purchase price to create a purchase wish list as shown in FIG. 6, and the list is stored in the database 18. For the sake of convenience herein, numbers 1 to 15 are entered in the column of "intending purchaser" (which means that there are fifteen intending purchasers), whereas, names or IDs of the intending purchasers would actually be entered instead. It should be understood that the numerical values shown in FIGS. 3 to 6 are for illustration only.

Figures 2, 4:
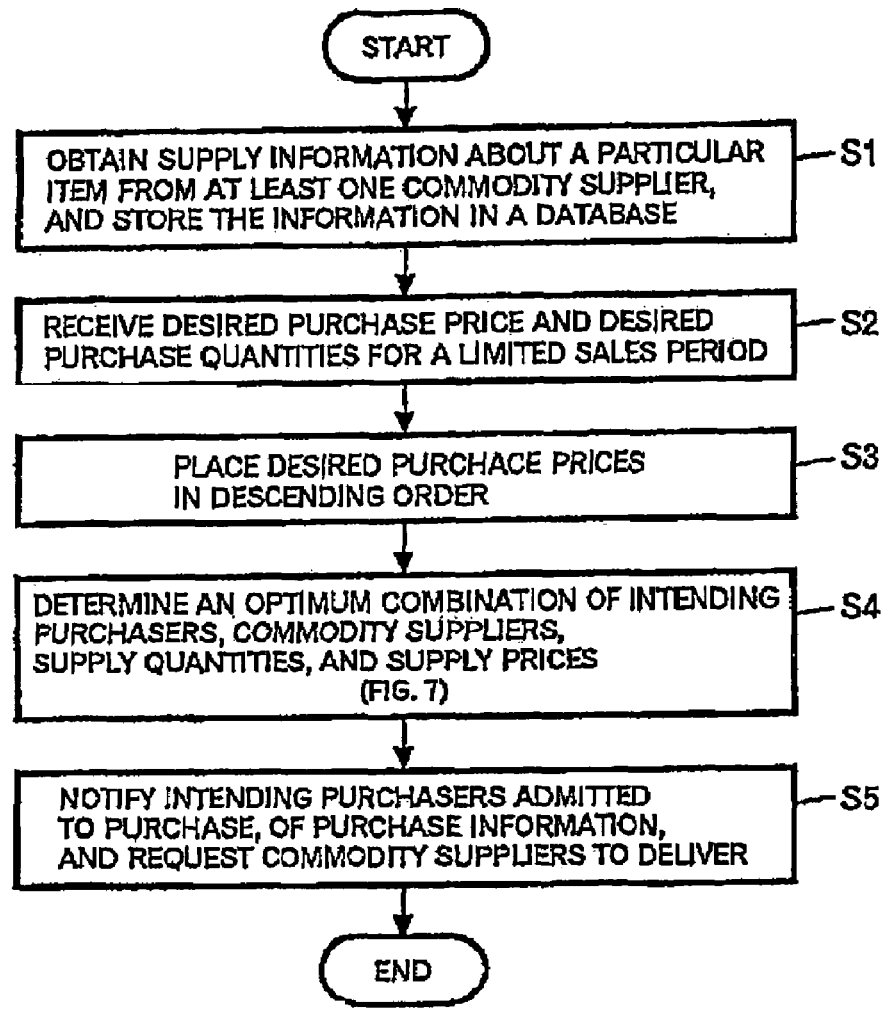
FIG. 2 is a flowchart of a commodity sales method according to the present invention.
FIG. 4 shows an example of supply information stored in a database in a seller server.

In the next step S4, the simulation model 20 refers to the lists shown in FIGS. 4 and 6 and determines an optimum combination of intending purchasers, commodity suppliers, supply quantities, and supply prices. Note that though not explicitly shown in step S4, once the intending purchasers are determined, the selling prices (desired purchase prices) and the quantities to sell (desired purchase quantities) are necessarily determined as well. Step S4 is preferably executed so that the gross profit of the seller is maximized. Details of step S4 will be described later with reference to FIG. 7.

After the optimum combination is determined, the simulation model 20 proceeds to step S5, informs the intending purchasers admitted to purchase of the purchase information by e-mail, for example, and requests the commodity suppliers to deliver the commodities concerned by the specified quantities and at the specified prices, respectively. It would, of course, be necessary to inform the other intending purchasers that their purchase wishes have not been accepted. In that case, if those purchasers are informed of shortfalls in their desired, there might be additional sales opportunities for the seller. The purchase information provided to the selected purchasers includes a commodity name, determined selling price (desired purchase price), quantity to be sold (desired purchase quantity), scheduled delivery date, and method of payment in addition to a message indicating the acceptance of his/her purchase wish. When the notification and request in step S5 end, the simulation model 20 ends. In practice, step S5 is followed by steps such as delivering commodities to the purchasers, settlement between the seller and the commodity suppliers and purchasers determined in step S4. These steps are, however, irrelevant to the present invention and well known in the art, they will not be described.

Referring to the flowchart in FIG. 7, step S4 in FIG. 2 will now be described in detail. The symbols used in the following description of the flowchart are as follows.

i: Number given to an intending purchaser. In the example of FIG. 6, i ranges from 1 to 15. This number is also a number of an iteration loop (cycle) in the flowchart in FIG. 7.

Pi: Desired purchase price of the intending purchaser i.
Vi: Desired purchase quantity of the intending purchaser i.
Ti: Takings from the intending purchaser i (=PiVi).
Si: Supply price (cost price) in the i-th cycle.
Gi: Aggregate gross profit up to the i-th cycle.
MaxGi: Maximum value of Gi in the first to i-th cycles.
Cj: Commodity supplier (j=a, b, c in the example shown in FIG. 4).
m: Total number of intending purchasers.

The first step S10 is an initialization step where MaxGi and i are initialized to 0 and 1, respectively. In the next step S11, ΣVi is calculated. Herein, "Σ" represents accumulation from 1 to a current value of i. Therefore, ΣVi equals V1+V2+ . . . + Vi. In the example of FIG. 6, ΣVi is initially 400 (i=1). After the accumulation, the model proceeds to step S12 where it is checked within which supply price range the accumulation value ΣVi is included by referring to the list shown in FIG. 4, and the minimum supply price Si within that supply price range and the supplier Cj offering the supply price Si are determined. The operation to be performed when the accumulation value ΣVi exceeds the maximum value in the supply price ranges (5000 in the example of FIG. 4) will be described later.

When the minimum supply price Si and the supplier Cj are determined, the model proceeds to step S13 where the aggregate gross profit Gi is calculated by the following equation:

$$Gi = \Sigma Ti - Si \Sigma Vi \qquad (1)$$

where ΣTi equals T1+T2+ . . . +Ti. Since Ti=PiVi, the aggregate gross profit Gi can also be expressed as follows:

$$Gi = V1(P1-Si) + V2(P2-Si) + \ldots + Vi(Pi-Si) \qquad (2)$$

It should be noted that in each of the desired purchase price Pi and the desired purchase quantity Vi, i varies from 1 to the current value while, for the supply price S1, only the value in the current cycle i is used. Representing Si by S for convenience, the equation (2) can be expressed as follows:

$$Gi = \Sigma Vi(Pi-S) \qquad (3)$$

Then, in step S14, it is checked whether the aggregate gross profit Gi is greater than MaxGi, and if the aggregate gross profit is greater than MaxGi, the model proceeds to step S15 where MaxGi is set to Gi, the value of i (specifying an intending purchaser), supply price Si and supplier ID (Cj) at that time are saved as sales information. When the step S15 ends or it is determined in step S14 that Gi is not greater than MaxGi, the model proceeds to step S16 where i is incremented by 1, and in the following step S17, it is determined whether i is greater than m. If i is not greater than m, the model returns to step S11 through a path 100 to iterate the above described operation, otherwise proceeds to step S18 to extract the sales information saved in step S15 and proceeds to step S5 in FIG. 2.

Figure 7:
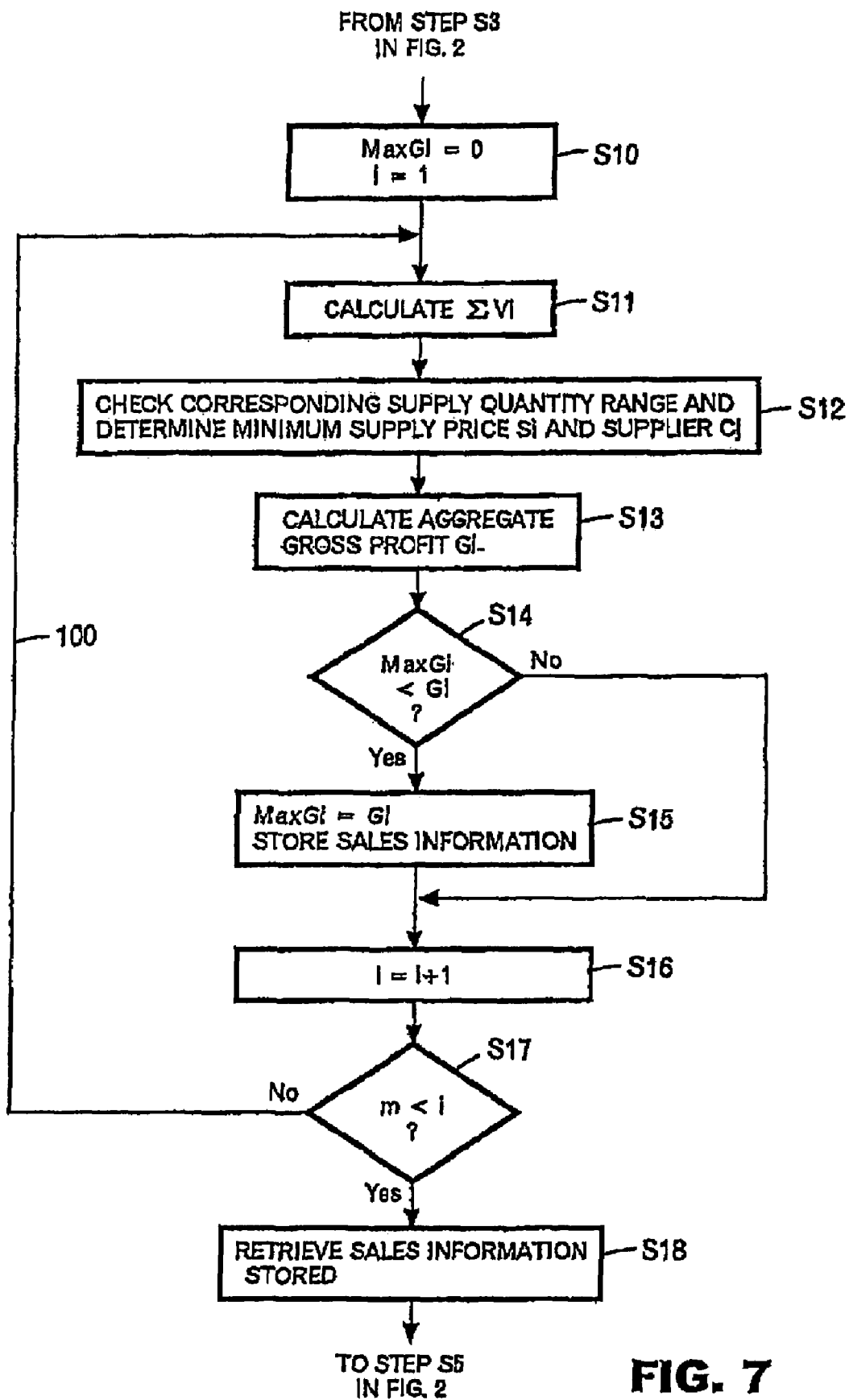
FIG. 7 is a flowchart showing in detail step S4 in FIG. 2.

The results of applying the operation in FIG. 7 to the lists in FIGS. 4 and 6 are shown in FIG. 8. The symbols used in FIG. 8 have the same meaning as above. The aggregate gross profit Gi decreases at i=9, decreases even more at i=10, and then significantly increases at i=11. This is because the supply price decreases as the supply quantity of the commodity supplier increases, so that merit of scale is obtained. If the calculation is terminated at i=8, no such merit is obtained. In the example of FIG. 8, since the sales information at i=14 is stored in step S15 in FIG. 7, the intending purchasers up to the fourteenth are able to purchase the commodities concerned. The fifteenth intending purchaser will be notified of unavailability of the commodities. If the fifteenth intending purchaser is, however, willing to buy the commodities at a unit price higher than 2900 yen, the aggregate gross profit Gi would increase. Therefore, the fifteenth intending purchaser may also be notified that by adding to their desired purchase price, the commodities may be obtained. Then, the seller might be able to sell the commodities depending upon the intending purchaser's wish. In the example of FIG. 8, if the number of intending purchasers is one or two, there would be a problem which supplier, Ca or Cb, should be selected, but this selection may be done based on the relationship between the seller and the suppliers Ca and Cb, which is irrelevant to the present invention.

As described above, FIG. 8 shows how the total desired purchase quantity □Vi, the supply price Si, the aggregate gross profit Gi, and the maximum aggregate gross profit MaxGi change for each iteration through the path 100 in FIG. 7 (the desired purchase price Pi and the desired purchase quantity Vi have been fixed at the start). It should be noted, however, that calculation of the aggregate gross profit Gi in the i-th iteration loop, the supply price Si at that time is applied to all the desired purchase prices P1 to Pi and desired purchase quantities V1 to Vi. Simply seeing FIG. 8, it may seem that, for example, S1 (3400 yen) is always applied to P1 and V1, and S5 (3200 yen) is always applied to P5 and V5, but this is not true. While this should be clear from the above equation (2), for the purpose of clarification, the supply price Si, the gross profit, and the aggregate gross profit Gi for each purchase wish information (Pi, Vi) are shown in FIGS. 9 to 12 for i=2 (supply quantity range: 1 to 1000), i=10 (supply quantity range: 1001 to 2000), i=13 (supply quantity range: 2001 to 3000) and i=15 (supply quantity range: 3001 to 4000), respectively. In FIGS. 9 to 12, Gi attached with an asterisk ( ) is the maximum gross profit MaxGi, and the "gross profit" is an individual gross profit for each intending purchaser.

Finally, when ΣVi calculated in step S11 in FIG. 7 exceeds the maximum value in the supply quantity ranges (5000 in the example of FIG. 4), a combination of some supply quantity ranges which should be optimum for ΣVi, that is, a combination which allows the seller to pay the least to the commodity suppliers (or to obtain the maximum gross profit) may be selected. If, for example, ΣVi is 5500, there may be the following combinations in the example of FIG. 4:

(a) The last supply quantity range of the supplier Ca (4001 to 5000) and the first supply quantity range of the supplier Cb (1 to 1000).

(b) The fourth supply quantity range of the supplier Ca (3001 to 4000) and the second supply quantity range of the supplier Cb (1001 to 2000).

(c) The third supply quantity range of the supplier Ca (2001 to 3000) and the third supply quantity range of the supplier Cb (2001 to 3000).

Calculating the gross profit using the supply price corresponding to each supply quantity range, it is seen that the optimum combination is (a) in which 5000 units are to be supplied from the supplier Ca and the remaining 500 units are to be supplied from the supplier Cb. Thus, the aggregate gross profit Gi can be calculated in step S13. The same calculation may be performed when ΣVi takes another value.

Note that, in practice, the calculation of the aggregate gross profit Gi in step S13 in FIG. 7 should be performed by taking into consideration various expenses required for commodity sales in addition to a difference between the selling and cost prices. It should be readily achieved by a person skilled in the art to add the calculation of such expenses to the flowchart in FIG. 7.

While the preferred embodiments of the present invention have been described in detail, it is clearly understood that the invention is not limited to these embodiments, and the invention may be subjected to various changes and modifications within the scope of the invention as claimed in the appended claims.

What is claimed:

1. A commodity sales system comprising:
    a database storing, in a supply list, information about a plurality of supply quantities and a supply price that, for each supply quantity, indicates a supply cost obtained from at least one commodity supplier for the particular commodity item;
    a seller server configured to perform the operations of
        receive purchase wish information from intending purchasers through a network for a predetermined period of time, the
        store the purchase wish information in the database,
        retrieve, from the database, the purchase wish information, the purchase wish information includes a desired purchase price and a desired purchase quantity for the particular commodity item,
        produce a purchase wish list having the information arranged in a predetermined order after the predetermined period of time,
        select an optimum combination of intending purchasers, selling quantities, selling prices, commodity suppliers, supply quantities, and supply prices by comparing only the desired purchase price and the desired purchase quantity from the purchase wish list with the supply price and the supply quantity from the supply list, and
        transmit a purchase admission notification to the selected intending purchasers, wherein
    the supply price lowers as the supply quantity increases, and
    each supply quantity is classified into a supply quantity range indicating a maximum supply quantity range for each commodity supplier.

2. The system according to claim 1, wherein
    the plurality of supply quantity ranges each have a same predetermined span, and
    one or more corresponding supply prices are indicated for each of the supply quantities for use in a single instance of the select operation.

3. The system according to claim 1, wherein
    the purchase wish list is arranged such that the desired purchase prices are placed in descending order from highest to lowest.

4. The system according to claim 3, wherein the select operation:
    selects the optimum combination so that a gross profit of a seller is maximized;
    determines a first value by summing a product of the desired purchase price and the desired purchase quantity for each transaction;
    determines a second value by summing the purchase quantity for each transaction;
    determines a third value by multiplying the second value and the supply price corresponding to the supply quantity range in the supply list that includes the second value; and
    calculates the gross profit by subtracting the third value from the first value.

5. The system according to claim 4, wherein the selecting operation:
    accumulates the desired purchase quantities by referring to the purchase wish list;
    checks within which supply quantity range in the supply list the accumulation result falls;
    determines a minimum supply price within the corresponding supply quantity range; and
    calculates an aggregate gross profit using the determined supply price.

* * * * *